United States Patent
Han et al.

(10) Patent No.: US 10,564,758 B2
(45) Date of Patent: Feb. 18, 2020

(54) TOUCH DISPLAY DEVICE, TOUCH DRIVING CIRCUIT AND METHOD FOR DRIVING THEREOF

(71) Applicant: LG DISPLAY CO., LTD., Seoul (KR)

(72) Inventors: Sungsu Han, Goyang-si (KR); SungChul Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 68 days.

(21) Appl. No.: 15/803,022

(22) Filed: Nov. 3, 2017

(65) Prior Publication Data
US 2018/0150173 A1    May 31, 2018

(30) Foreign Application Priority Data
Nov. 29, 2016 (KR) .................. 10-2016-0160259

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0412* (2013.01); *G06F 2203/04103* (2013.01); *G06F 2203/04112* (2013.01)

(58) Field of Classification Search
CPC .... G06F 3/044; G06F 3/0416; G06F 3/04104; G06F 3/0414
See application file for complete search history.

(56) References Cited

U.S. PATENT DOCUMENTS

2017/0147141 A1* 5/2017 Khazeni ................ G06F 3/0418
2017/0249031 A1* 8/2017 Jiang ...................... G06F 3/044
2017/0269773 A1* 9/2017 Suzuki ................... G06F 3/0416

* cited by examiner

*Primary Examiner* — Yuzhen Shen
(74) *Attorney, Agent, or Firm* — Morgan, Lewis & Bockius LLP

(57) ABSTRACT

The present exemplary embodiments relate to a touch display device and a driving method thereof. According to the present exemplary embodiments, when a touch of the user is sensed during a touch sensing period of each frame, the touch force is sensed by being limited to an area determined based on the sensed touch position, thereby efficiently sensing the touch force. In this case, the touch force sensing is repeated for a limited area during the force sensing period of each frame, so that the touch force sensing report rate is improved. Further, the touch force sensing is performed only during the force sensing period of a frame allocated to a limited area so that power consumption according to the touch force sensing is reduced and the precision for sensing a touch force may be maintained.

15 Claims, 13 Drawing Sheets

FIG.4
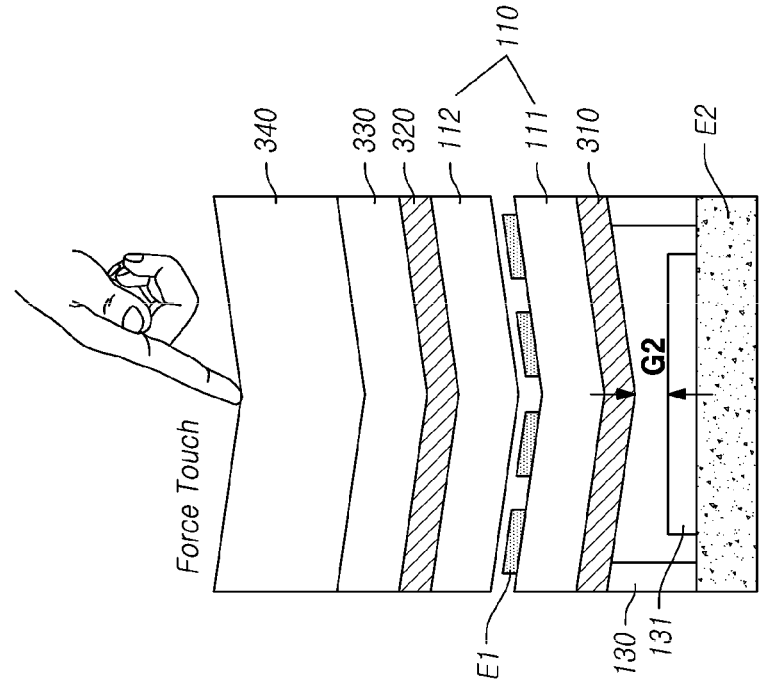
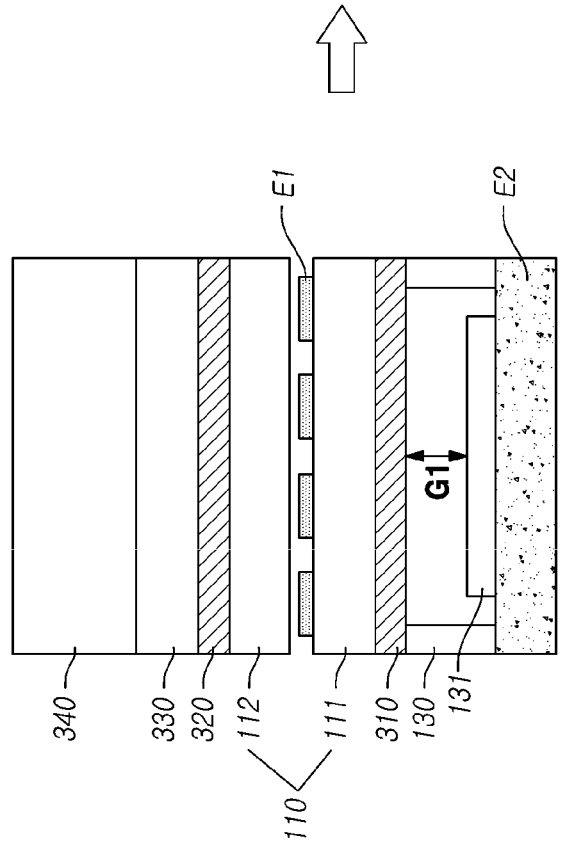

TOUCH DISPLAY DEVICE, TOUCH DRIVING CIRCUIT AND METHOD FOR DRIVING THEREOF

CROSS-REFERENCE TO RELATED APPLICATIONS

This application claims priority from Korean Patent Application No. 10-2016-0160259, filed on Nov. 29, 2016, which is hereby incorporated by reference for all purposes as if fully set forth herein.

BACKGROUND

Technical Field

The present exemplary embodiments relate to a touch display device, a touch driving circuit, and a method for driving thereof.

Description of the Related Art

With progress of the information-oriented society, various types of demands on display devices for displaying an image are increasing. Further, various types of display devices, such as a liquid crystal display device, a plasma display device, and an organic light emitting display device, have been utilized.

Among these display devices, a mobile device, such as a smart phone or a tablet, or a medium or large size device, such as a smart television, provides a touch based input processing according to user's convenience and device characteristics.

A display device in which the touch based input processing is available is developed to provide various functions and demands of users are also diversifying.

However, the touch based input processing which is currently applied is performed by sensing only a touch position (touch coordinate) of the user and performing a related input processing in the sensed touch position. Therefore, there are limitations in the current situation in which various types of functions are provided in various forms and demands of various users need to be satisfied.

SUMMARY

Accordingly, embodiments of the present disclosure are directed to a touch display device, a touch driving circuit, and a method for driving thereof that substantially obviate one or more of the problems due to limitations and disadvantages of the related art.

An aspect of the present exemplary embodiments is to provide a touch display device, a touch driving circuit, and a driving method thereof which may recognize not only a touch position (touch coordinate) of a user with respect to the touch display device, but also a touch force of the user.

Another aspect of the present exemplary embodiments is to provide a touch display device, a touch driving circuit, and a driving method thereof which may improve a precision for sensing a touch force of a user with respect to the touch display device.

Another aspect of the present exemplary embodiments is to provide a touch display device, a touch driving circuit, and a driving method thereof which may precisely sense a touch force of a user with respect to the touch display device while reducing power consumption.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a touch display device comprises a plurality of first electrodes embedded in a display panel, a second electrode which is located below the display panel and is disposed to be spaced apart from the first electrodes, and a touch driving circuit which outputs a driving signal to at least one of the first electrodes and the second electrode during a touch driving period and receives a sensing signal from the first electrodes.

When a touch is sensed based on the sensing signal received in a touch sensing period of the touch driving period of an N-th frame, the touch driving circuit of the touch display device receives the sensing signal from two or more first electrodes disposed in an area determined based on a sensed touch position during the force sensing period of the touch driving period of an N+1-th frame.

Here, the touch driving circuit may divide the plurality of first electrodes into M groups to receive the sensing signal and receive the sensing signal from two or more first electrodes disposed in a group including the sensed touch position.

Alternatively, the touch driving circuit may receive a sensing signal from two or more first electrodes disposed within a predetermined distance from the sensed touch position.

The touch driving circuit may receive the sensing signal from two or more first electrodes disposed in an area determined based on a sensed touch position during the force sensing period of each frame while sensing the touch in the sensed touch position.

Alternatively, the touch driving circuit may receive the sensing signal from two or more first electrodes disposed in different areas during the force sensing period of each frame and receive the sensing signal only during the force sensing period of a frame in which the sensing signal is received from two or more first electrodes disposed in an area including a sensed touch position while sensing the touch in the sensed touch position.

In another aspect, a touch driving circuit comprises: a driving signal output unit which outputs a driving signal to at least one electrode of a plurality of first electrodes and a second electrode during a touch driving period, a sensing signal receiving unit which receives a sensing signal from the first electrodes during the touch driving period, and a control unit which controls the driving signal output unit and the sensing signal receiving unit, in which when a touch is sensed based on the sensing signal received in a touch sensing period of the touch driving period of an N-th frame, the sensing signal receiving unit receives the sensing signal from two or more first electrodes disposed in an area determined based on a sensed touch position in the force sensing period of the touch driving period of an N+1-th frame.

The touch driving circuit may be driven by receiving a sensing signal from a plurality of first electrodes embedded in a display panel during a touch sensing period of an N-th frame, sensing a touch based on the received sensing signal, and receiving the sensing signal from two or more first electrodes disposed in an area determined based on a sensed touch position during a force sensing period of an N+1-th frame.

According to the present exemplary embodiments, when user's touch with respect to the touch display device is sensed, a touch force is sensed by being limited to an area determined based on the sensed touch position, thereby improving a precision for sensing a touch force.

According to the present exemplary embodiments, when user's touch with respect to the touch display device is sensed, a touch force is sensed only in a frame which is allocated to an area determined based on the sensed touch position, thereby precisely sensing a touch force while reducing power consumption.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated and constitute a part of this application, illustrate embodiments of the disclosure and together with the description serve to explain various principles. In the drawings:

FIG. 4 is a view for explaining a principle of sensing a touch force in a touch display device according to the present exemplary embodiments;

DETAILED DESCRIPTION

Figure 1:
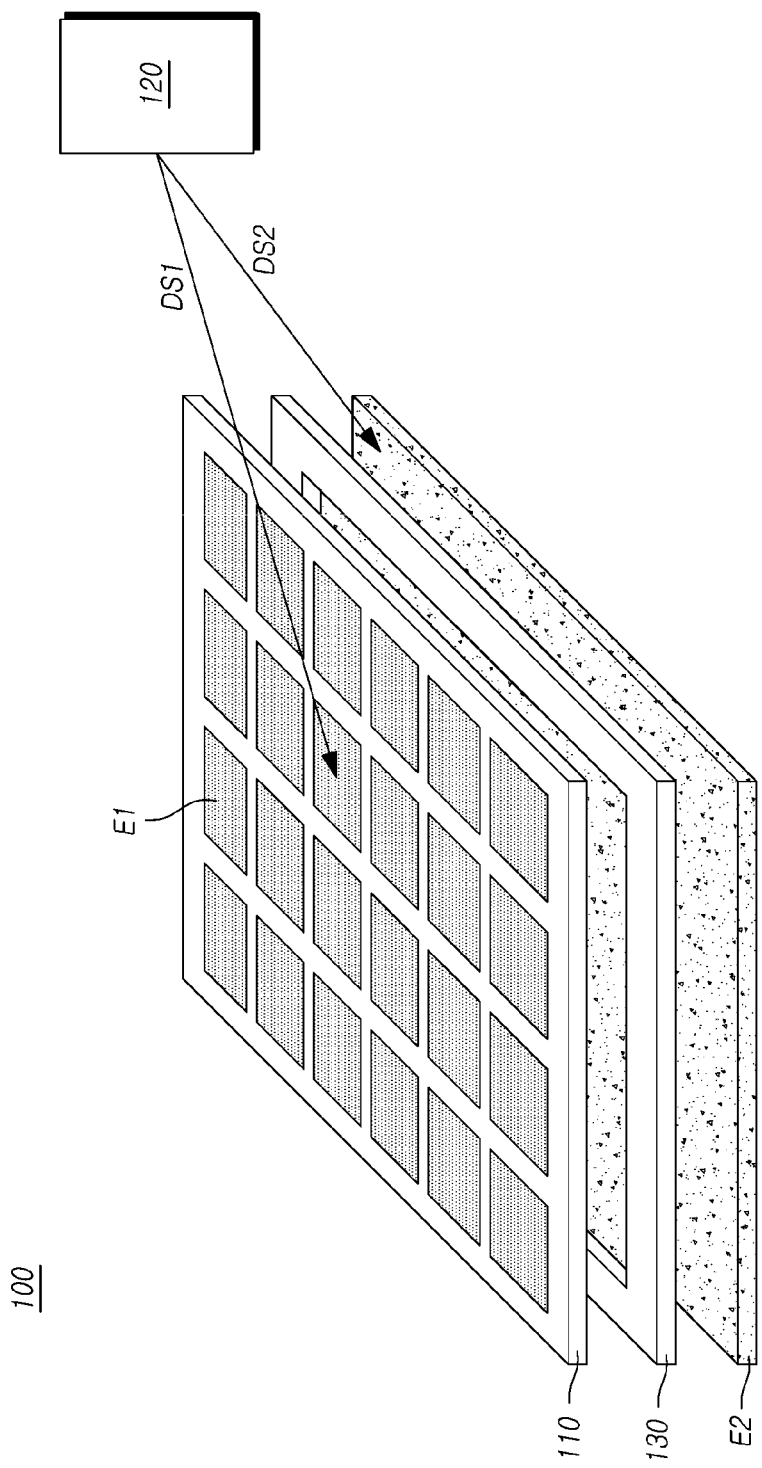
FIGS. 1 and 2 are views illustrating a schematic configuration of a touch display device according to the present exemplary embodiments.

Hereinafter, some embodiments of the present disclosure will be described in detail with reference to the accompanying drawings. When reference numerals refer to components of each drawing, although the same components are illustrated in different drawings, the same components are referred to by the same reference numerals as possible. Further, if it is considered that description of related known configuration or function may cloud the gist of the present disclosure, the description thereof will be omitted.

Further, in describing components of the present disclosure, terminologies such as first, second, A, B, (a), and (b) may be used. The terminologies are used to distinguish one component from another component. However, a nature, an order, a sequence, or the number of components are not limited by the terminologies. If it is described that a component is "connected" or "coupled" to another component, it is understood that the component is directly connected or coupled to the other component but a component may be interposed between the components or the components may be "connected" or "coupled" through another component.

Figure 2:
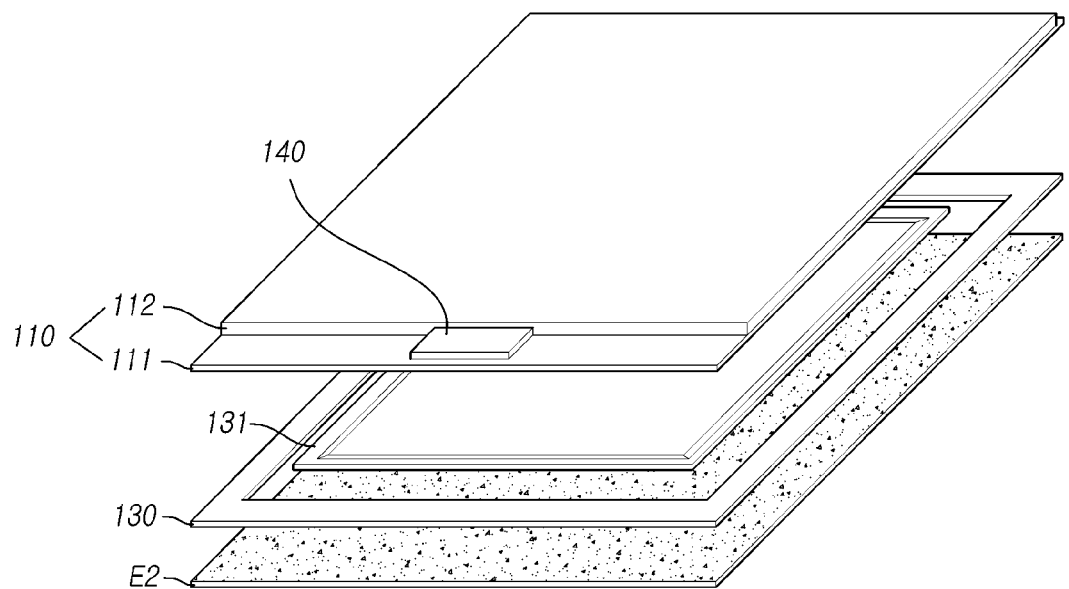

FIGS. 1 and 2 illustrate a schematic configuration of a touch display device 100 according to the present exemplary embodiments.

Referring to FIG. 1, a touch display device 100 according to the present exemplary embodiments may include a plurality of first electrodes E1 which senses whether there is a user's touch and a touch position (touch coordinate), a second electrode E2 which senses a touch force of the user, a display panel 110 in which the plurality of first electrodes E1 is embedded, a touch driving circuit 120 which drives the plurality of first electrodes E1 and the second electrode E2, and a gap structure unit 130 which maintains a gap between the plurality of first electrodes E1 and the second electrode E2.

The touch display device 100 according to the present exemplary embodiments may operate in a display mode for displaying an image (display driving) or operate in a touch mode for sensing a touch (whether there is a touch, a touch position, and a touch force) of the user (touch driving).

When the touch display device 100 operates in a display mode, data lines and gate lines disposed in the display panel 110 are driven to display an image.

In this case, the plurality of first electrodes E1 embedded in the display panel 110 is applied with a display driving voltage for displaying an image. That is, the plurality of first electrodes E1 operates as electrodes for display driving during a display driving period.

When the touch display device 100 operates in a touch mode, the touch display device 100 may sense a touch position (touch coordinate) of the user or sense a touch force of the user.

When the touch position (touch coordinate) of the user is sensed (a touch sensing period), the touch driving circuit 120 sequentially applies a first electrode driving signal DS1 to the plurality of first electrodes E1 to sense the touch position (touch coordinate) of the user.

When the touch force of the user is sensed (a force sensing period), the touch driving circuit 120 applies the first electrode driving signal DS1 to the plurality of first electrodes E1 and applies a second electrode driving signal to the second electrode E2 and receives the sensing signal from the first electrodes E1 to sense the touch force of the user.

When a vertical load of the user with respect to the display panel 110 is generated, the touch display device 100 according to the present exemplary embodiments senses the touch force of the user using a change in a gap between the plurality of first electrodes E1 and the second electrode E2.

Therefore, a gap is required between the plurality of first electrodes E1 embedded in the display panel 110 and the second electrode E2 located outside the display panel 110 and the gap structure unit 130 may be disposed between the plurality of first electrodes E1 and the second electrode E2 to maintain the gap.

That is, when the user's touch is generated, a size of the gap between the plurality of first electrodes E1 and the second electrode E2 may be changed by the gap structure unit 130 and not only the touch position (touch coordinate) of the user, but also the touch force may be sensed using the change in the size of the gap.

Hereinafter, a more specific structure of the touch display device 100 according to the present exemplary embodiments will be described with reference to FIG. 2.

Referring to FIG. 2, the touch display panel 110 of the touch display device 100 according to the present exemplary embodiments may be configured by a first substrate 111 on which thin film transistors TFT are disposed and a second substrate 112 on which color filters CF are disposed.

Further, a driving chip 140 may be mounted, bonded, or connected to a border portion (non-active area) of the first substrate 111.

Here, the driving chip 140 may be a chip which may implement all or a part of the touch driving circuit 120 or a data driving chip. Further, the driving chip 140 may be a display driving chip which includes all or a part of the touch driving circuit 120 and the data driving chip.

A lower structure 131 may be located below the display panel 110 and the second electrode E2 may be located below or in the lower structure 131.

For example, the lower structure 131 may be a back light unit of a liquid crystal display device.

In this case, the second electrode E2 may be located below the back light unit. Therefore, the second electrode E2 may be disposed without interrupting a light irradiating function of the back light unit.

The gap structure unit 130 may be located below, inside, or a side of the lower structure 131. Further, the second electrode E2 may be located below or in the gap structure unit 130.

As described above, the position of the second electrode E2 or the position of the gap structure unit 130 are designed in various ways, so that a touch force sensing structure suitable for a design structure of the display panel 110 and the touch display device 100 may be implemented.

Hereinafter, a method for sensing a touch position (touch coordinate) and a touch force of the user by the touch display device 100 according to the present exemplary embodiment will be described with reference to FIGS. 3 and 4. For the convenience of description, the liquid crystal display device will be described as an example of the touch display device 100 according to the present exemplary embodiments.

Figure 3:
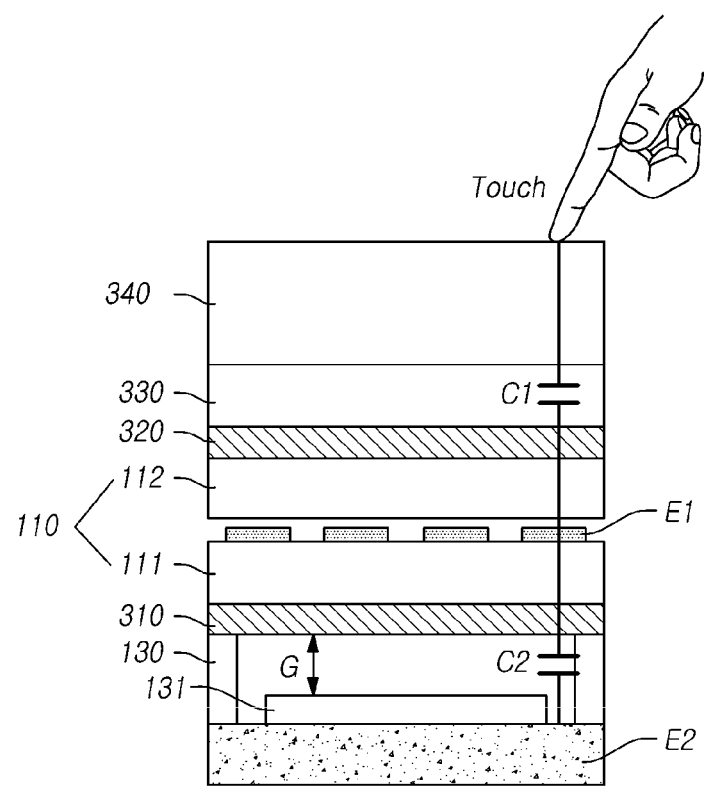
FIG. 3 is a view illustrating an example of a cross-sectional structure of a touch display device according to the present exemplary embodiments.

FIG. 3 illustrates a cross-section of the touch display device 100 according to the present exemplary embodiments and FIG. 4 illustrates a situation in which a gap between the plurality of first electrodes E1 and the second electrode E2 is changed by the touch of the user with respect to the touch display device 100.

Referring to FIG. 3, the display panel 110 in the touch display device 100 includes a first polarizer 310, a first substrate 111, a plurality of first electrodes E1, a second substrate 112, and a second polarizer 320.

Further, a bonding layer 330 and an upper cover 340 are located on the display panel 110.

The touch display device 100 applies a first electrode driving signal DS1 to the plurality of first electrodes E1 during a touch sensing period for sensing a touch position (touch coordinate) of the user of a touch driving period.

Further, when the user's touch is generated, the touch display device 100 senses a change in a magnitude of a first capacitance C1 between a pointer which is a conductor, such as a finger of the user, and the plurality of first electrodes E1 to sense the touch position (touch coordinate) of the user.

The touch display device 100 applies the first electrode driving signal DS1 to the plurality of first electrodes E1 and applies a second electrode driving signal DS2 to the second electrode E2 during a force sensing period for sensing a touch force of the user of the touch driving period.

In this case, the second electrode driving signal DS2 which is applied to the second electrode E2 may be a ground voltage signal.

When a vertical load by the touch of the user is generated, the touch display device senses a change in a magnitude of a second capacitance C2 according to a change of a gap G between the plurality of first electrodes E1 and the second electrode E2 to sense the touch force of the user.

That is, when the touch of the user is generated, the touch display device senses the touch position (touch coordinate) by sensing the change in the first capacitance C1 and senses the touch force by sensing the change in the second capacitance C2. A gap G is provided between the plurality of first electrodes E1 and the second electrode E2 so as to allow the touch display device to sense the change in the second capacitance C2.

Referring to FIG. 4, when a vertical load by the touch of the user is generated, the upper cover 340 and the display panel 110 may be slightly downwardly bent.

Accordingly, a size of a gap G provided between the plurality of first electrodes E1 and the second electrode E2, such as an air gap or a dielectric gap, may be changed.

As illustrated in FIG. 4, when it is assumed that a gap G before generating the vertical load by the touch of the user is G1 and a gap G after generating the vertical load by the touch of the user is G2, G2 may be smaller than G1 due to the vertical load.

As described above, as the gap G between the plurality of first electrodes E1 and the second electrode E2 is reduced from G1 to G2 due to the vertical load generated by the touch of the user, the second capacitance C2 is changed so that the touch force of the user may be sensed.

In this case, the touch driving circuit 120 of the touch display device 100 receives a sensing signal from the first electrodes E1 during the touch sensing period and the force sensing period to sense the touch position (touch coordinate) and the touch force.

Therefore, since the touch sensing period and the force sensing period are time-divided to sense the touch position (touch coordinate) and the touch force and the force sensing period is configured to be shorter than the touch sensing period, a precision for sensing a touch force may be lowered.

When an operation for sensing a touch force even in an area where a touch is not generated during the force sensing period is performed, a power may be unnecessarily consumed.

The touch display device 100 according to the present exemplary embodiments provides a method for improving a sensing precision of the touch force and reducing power consumption in a method for time-dividing and sensing the touch position (touch coordinate) and the touch force.

Figure 5:
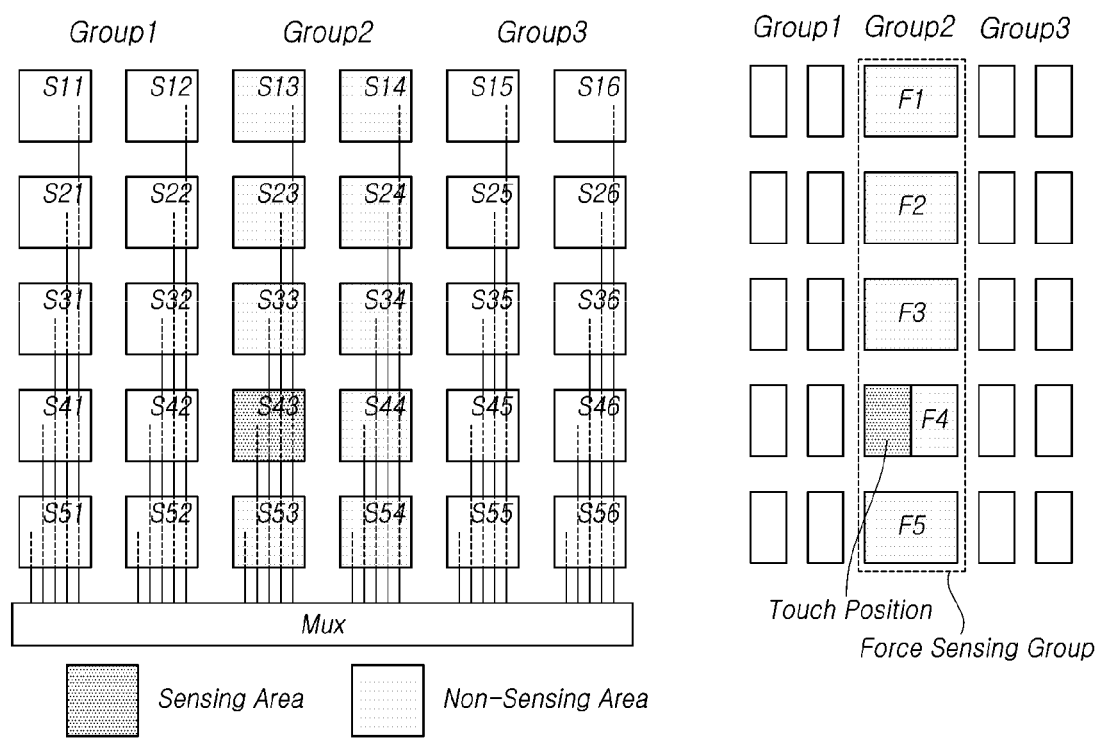
FIGS. 5 and 6 are views for explaining a method for sensing a touch force in a touch display device according to the present exemplary embodiments.
Figure 6:
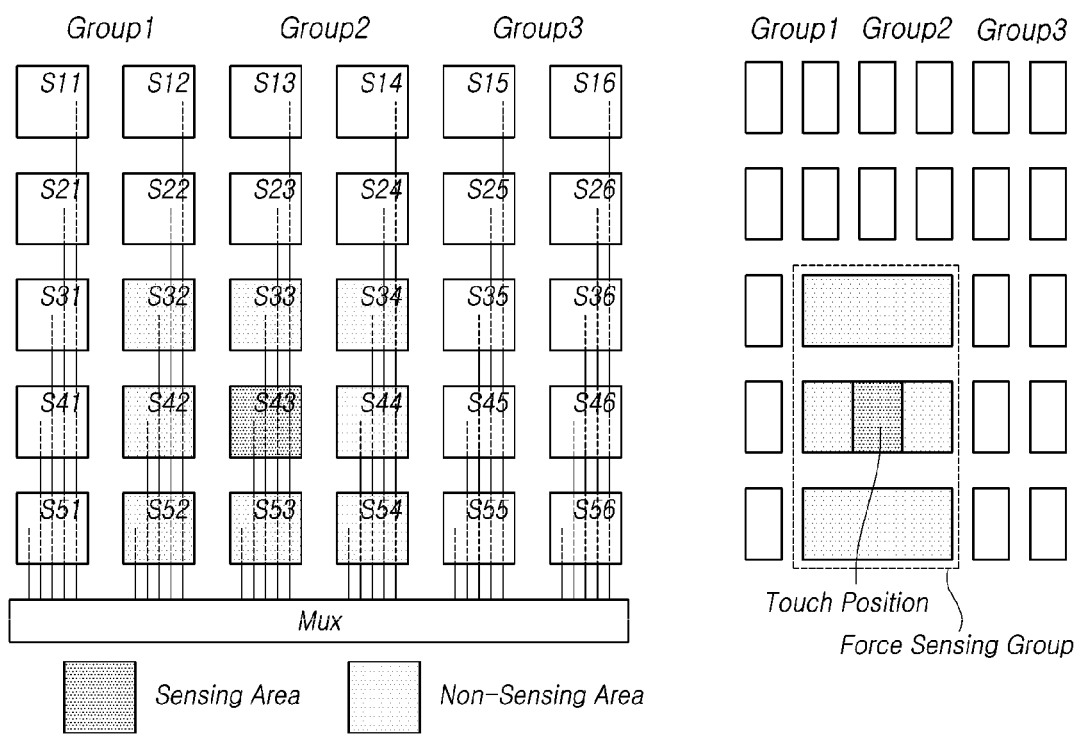

FIGS. 5 and 6 illustrate an example of a method for sensing a touch force in a touch display device 100 according to the present exemplary embodiments.

Referring to FIGS. 5 and 6, when the user's touch is sensed during the touch sensing period, the touch display device 100 according to the present exemplary embodiments senses the touch force by being limited to an area determined based on the sensed touch position.

Since the touch display device 100 senses the touch force by being limited to area determined based on the touch position (touch coordinate), a touch force for the same area is sensed for every force sensing period of each frame so that precision for sensing the touch force may be improved.

Alternatively, the touch force is sensed only during a force sensing period of a frame which is allocated to a corresponding area, so that the power consumption may be reduced and the precision for sensing the touch force may be maintained.

The method of limiting a touch force sensing area according to the touch position (touch coordinate) may use a fixed touch force sensing area or a touch force sensing area which varies according to the touch position (touch coordinate).

FIG. 5 illustrates a method for sensing a touch force using a fixed touch force sensing area by a touch display device 100 according to the exemplary embodiments.

Referring to FIG. 5, the touch display device 100 according to the exemplary embodiments applies the first electrode driving signal DS1 to the first electrodes E1 and receives the sensing signal from the first electrodes E1 to sense whether there is a touch and the touch position (touch coordinate), during the touch sensing period of the touch driving period.

Further, the touch display device 100 applies the second driving signal DS2 to the second electrode E2 and receives the sensing signal from some of the plurality of first electrodes E1 to sense the touch force, during the force sensing period of the touch driving period.

The touch display device 100 divides the plurality of first electrodes E1 disposed in the display panel 110 into M (for example, three) groups and sequentially receives the sensing signals from a first group, a second group, . . . , and an M-th group during the force sensing period of each frame to sense the touch force, M is a positive integer greater than 1.

In this case, when the touch of the user is sensed during the touch sensing period, the touch display device 100 according to the exemplary embodiments receives a sensing signal from two or more first electrodes E1 disposed in a group including a sensed touch position to sense the touch force.

Further, the touch display device 100 receives a sensing signal from two or more first electrodes E1 disposed in a group including a position of a sensed touch for every force sensing period of each frame to sense the touch force while sensing the touch in the corresponding position.

For example, when a touch is sensed in a position of a first electrode E1 corresponding to S43 among the plurality of first electrodes E1 during the touch sensing period, the touch display device receives a sensing signal from two or more first electrodes E1 disposed in the second group including S43 during the force sensing period of each frame and senses the touch force.

That is, the touch display device senses the touch force only in an area corresponding to the second group determined based on the sensed touch position (touch coordinate) for every force sensing period of each frame.

By doing this, since a report rate of a sensing signal for sensing the touch force is improved, a precision for sensing a touch force may be improved.

Alternatively, when the touch of the user is sensed, the touch display device may receive a sensing signal for sensing the touch force only during a force sensing period of a frame which is assigned to a group including a sensed touch position.

For example, when a touch is sensed in a position of the first electrode E1 corresponding to S43 among the plurality of first electrodes E1, the touch display device receives a sensing signal only during the force sensing period of a frame which is assigned to the second group including S43 and senses the touch force.

Therefore, since the touch force is not sensed during a force sensing period of frames which are assigned to the first group and the third group, power consumption for sensing a touch force may be reduced.

The touch force for an area determined based on the touch position (touch coordinate) is sensed while reducing the power consumption for sensing a touch force so that a precision for sensing a touch force may be maintained.

The touch display device 100 according to the present exemplary embodiments does not set an area determined based on the touch position (touch coordinate), based on a fixed group, but may variably set the area determined based on the touch position, based on a position where the touch is sensed.

FIG. 6 illustrates a method for sensing a touch force using a variably set touch force sensing area by a touch display device 100 according to the exemplary embodiments.

Referring to FIG. 6, the touch display device 100 according to the present exemplary embodiments receives the sensing signal from the first electrodes E1 during the touch sensing period of the touch driving period to sense the touch position (touch coordinate).

When the touch is sensed, the touch display device 100 receives a sensing signal from two or more first electrodes E1 disposed in an area which is variably determined based on the position of the touch sensed during the force sensing period to sense a touch force.

The area which is variably determined based on the sensed touch position may be determined to include a first electrode E1 adjacent to the first electrode E1 corresponding to the touch position (touch coordinate). Alternatively, the area which is variably determined based on the sensed touch position may be determined to include a first electrode E1 disposed within a predetermined distance from the first electrode E1 corresponding to the touch position (touch coordinate).

When a touch force sensing area is determined based on the touch position (touch coordinate), the touch display device receives a sensing signal from a touch force sensing area determined during the force sensing period of each frame and senses the touch force, to improve a force sensing report rate. Therefore, the precision for sensing a touch force may be improved.

Alternatively, the touch display device may sense the touch force only during the force sensing period of a frame which is assigned to the determined touch force sensing area, so that the power consumption may be reduced and the touch force may be precisely sensed.

When the user applies a force while touching the touch display device, a contact area with the display panel 110 may be larger than that of a touch to which a force is not applied.

Therefore, a method for sensing a touch force in an area which is variably set based on the touch position (touch coordinate) may provide an advantage in that a touch force is sensed for an area in which a touch force sensing possibility is higher than that of a method which uses a fixed touch force sensing area.

Hereinafter, a method for sensing a touch force by limiting a touch force sensing area according to a touch position (touch coordinate) by the touch display device 100 according to the present exemplary embodiments will be specifically described with reference to FIGS. 7 to 12.

Figure 7:
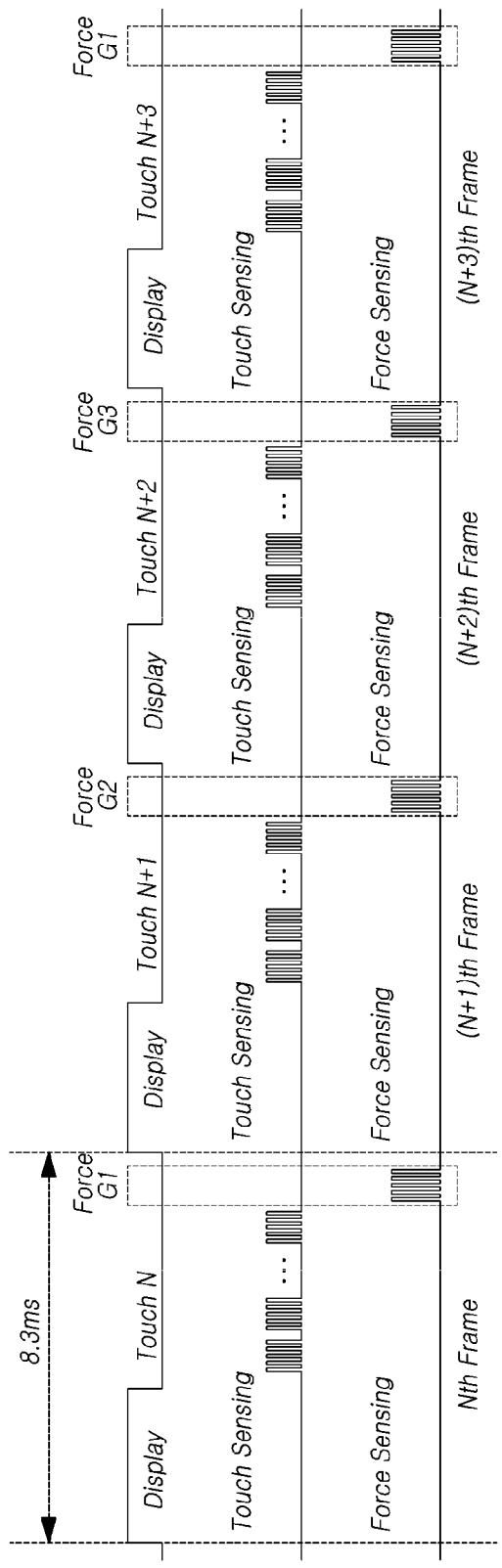
FIGS. 7 to 9 are views illustrating an example of a method for sensing a touch force when a touch is sensed at the time of V-blank driving in a touch display device according to the present exemplary embodiments.
Figure 8:
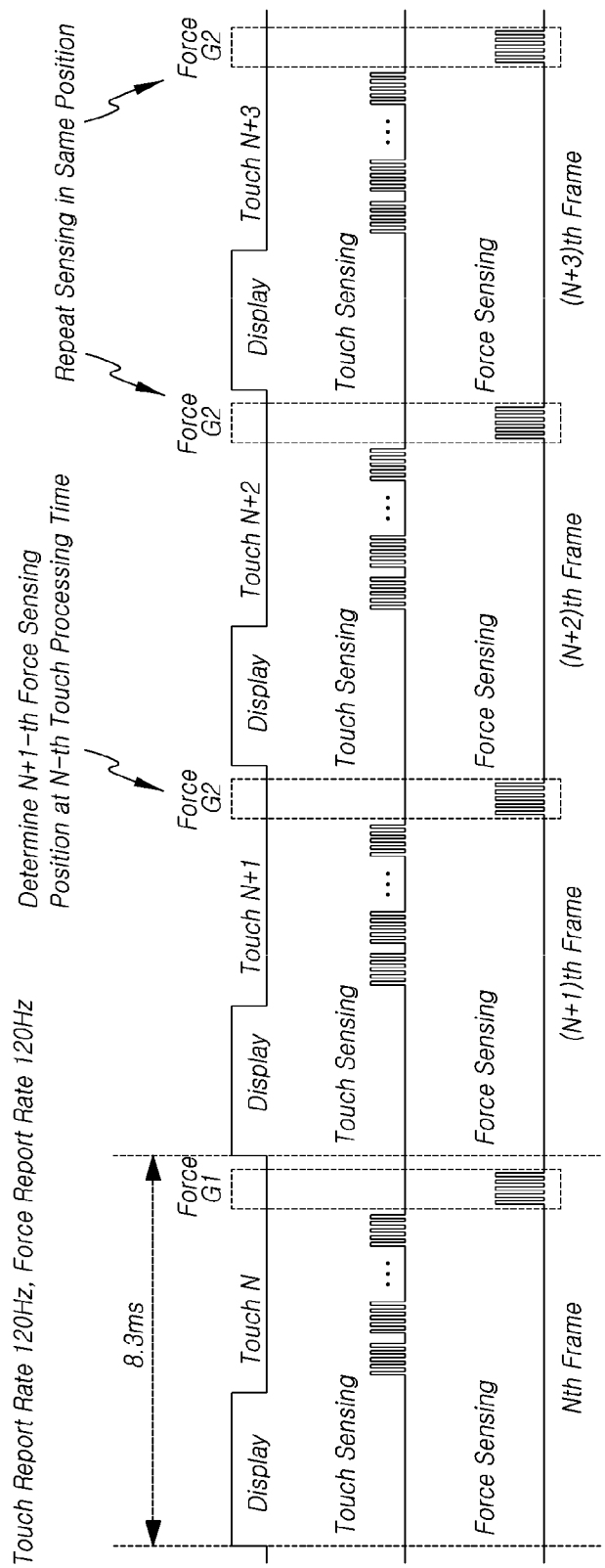
Figure 9:
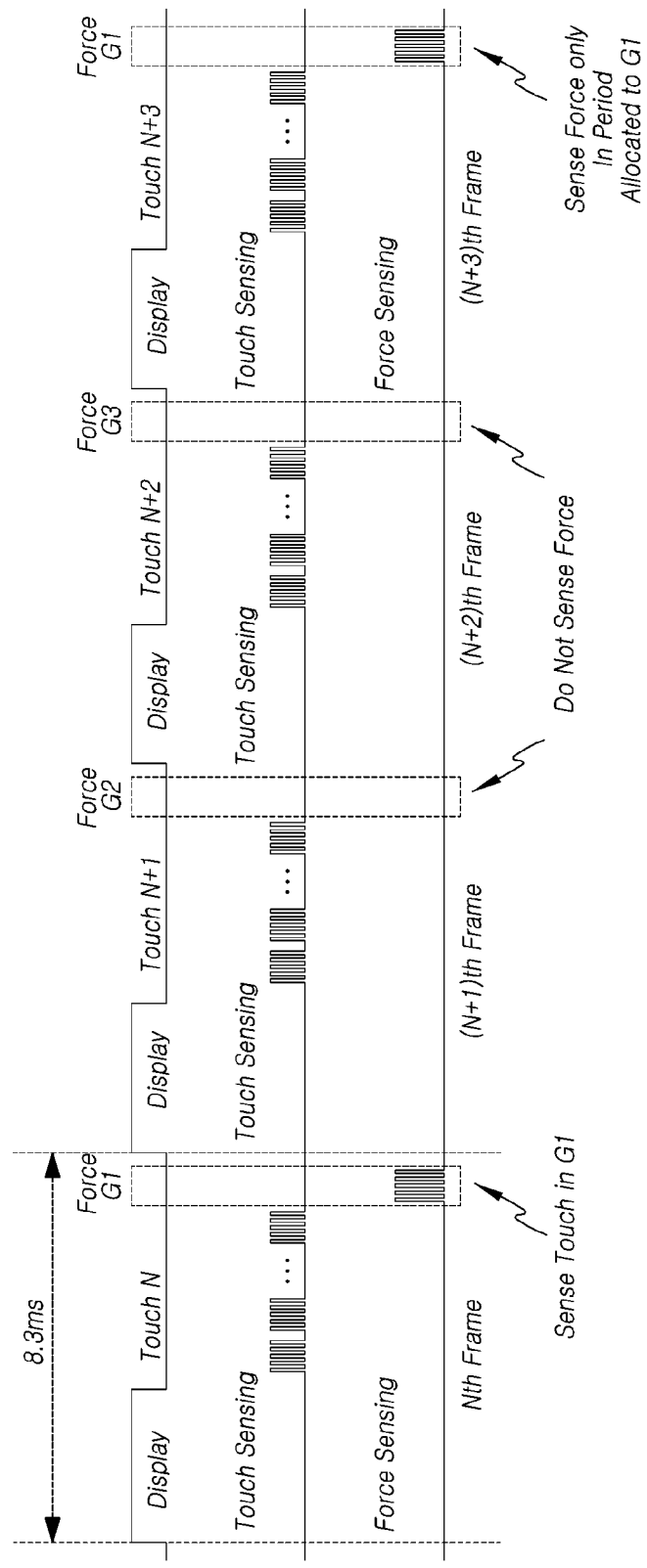

FIGS. 7 to 9 illustrate a timing of sensing a touch force at the time of V-blank driving of a touch display device 100 according to the present exemplary embodiments.

FIG. 7 illustrates a method for sensing a touch force before sensing a touch of the user and FIGS. 8 and 9 illustrate a method for sensing a touch force after sensing a touch.

Referring to FIG. 7, the touch display device 100 according to the present exemplary embodiments operates by dividing each frame period into a display driving period and a touch driving period.

FIG. 7 illustrates a case in which the touch display device 100 according to the present exemplary embodiments is driven at 120 Hz as an example. In this case, one frame period is 8.3 ms and the frame period of 8.3 ms is divided into a display driving period and a touch driving period. The touch position (touch coordinate) and the touch force are sensed during the touch driving period.

The touch display device 100 receives a sensing signal from two or more first electrodes E1 disposed in the first group among groups divided during the force sensing period of an N-th frame and senses the touch force.

Further, the touch display device 100 senses the touch force for the second group and the third group in an N+1-th frame and an N+2-th frame, respectively, and senses the touch force for the first group in an N+3-th frame, again.

Therefore, the touch display device 100 may sense the touch position (touch coordinate) and the touch force of the user through the touch sensing period and the force sensing period of each frame.

When the user's touch is sensed, the touch display device 100 senses the touch force by being limited to an area determined based on the sensed touch position.

FIG. 8 illustrates an example of a method for sensing a touch force by the touch display device 100 after sensing the user's touch.

Referring to FIG. 8, when the user's touch is sensed during the touch sensing period of an N-th frame, the touch display device 100 according to the present exemplary embodiments determines an area where the touch force is to be sensed during the force sensing period of the N+1-th frame based on the sensed touch position.

A case when the touch display device 100 uses a fixed touch force sensing area will be described as an example. When the touch is sensed in the first electrode E1 included in the second group in the N-th frame, the touch display device senses the touch force for the second group during the force sensing period of the N+1-th frame based on the sensed touch position.

Further, the touch display device senses the touch force for the second group also during a force sensing period of an N+2-th frame and senses the touch force for the second group during a force sensing period of an N+3-th frame.

That is, the touch display device senses the touch force by being limited to an area determined based on the touch position for every force sensing period of each frame before sensing a touch in a position different from the sensed touch position to improve a touch force sensing report rate.

Alternatively, the touch display device senses the touch force only during the force sensing period allocated to an area where the touch is sensed to reduce the power consumption.

FIG. 9 illustrates another example of a method for sensing a touch force by the touch display device 100 after sensing the touch of the user.

Referring to FIG. 9, the touch display device 100 senses the touch position (touch coordinate) and the touch force during the touch driving period of each frame.

When the touch of the user is sensed from the first electrode E1 included in the first group during the touch sensing period of the N-th frame, the touch display device senses the touch force only during the force sensing period of the frame including the force sensing period allocated to the first group.

Therefore, the touch display device does not sense the touch force during a force sensing period of the N+1-th frame allocated as a touch force sensing period for the second group and does not sense the touch force during a force sensing period of the N+2-th frame allocated as a touch force sensing period for the third group.

Further, the touch display device senses the touch force during a force sensing period of the N+3-th frame allocated as a touch force sensing period for the first group.

Therefore, the touch display device does not sense the touch force during the force sensing period of the N+1-th frame and during the force sensing period of the N+2-th frame so that the power consumption may be reduced.

Further, the touch display device continuously senses the touch force for an area determined based on the sensed touch position, so that the precision for sensing a touch force may be maintained.

In the meantime, the touch display device 100 according to the present exemplary embodiments may sense the touch force by being limited to an area determined based on the sensed touch position also in the case of the LHB driving.

Figure 10:
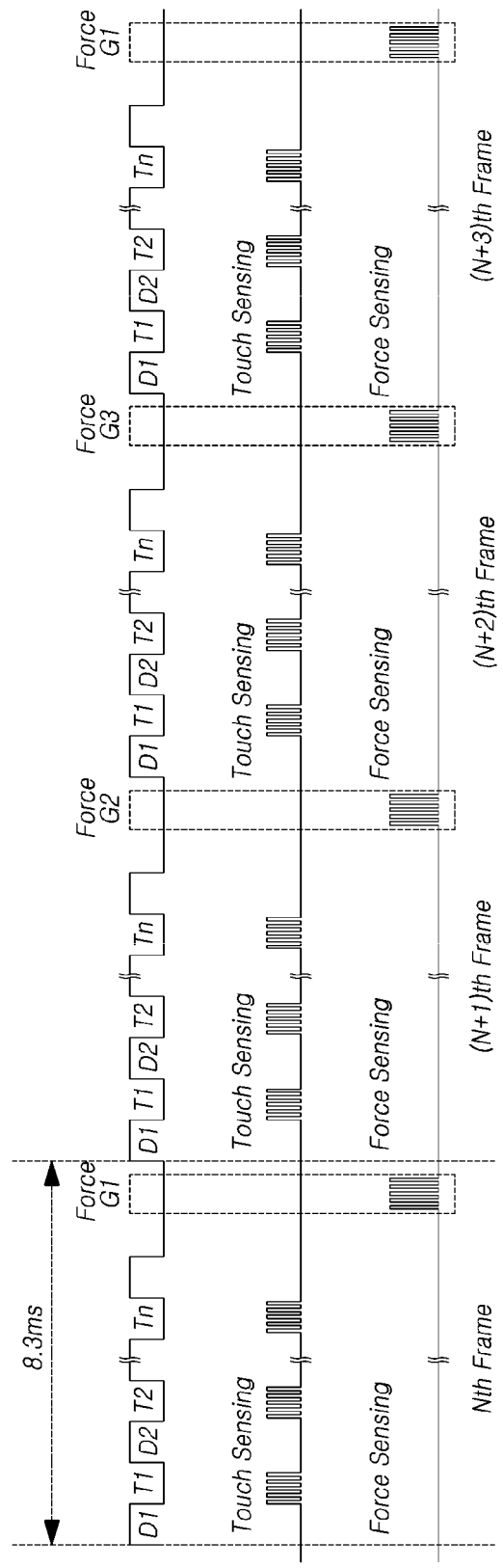
FIGS. 10 to 12 are views illustrating an example of a method for sensing a touch force when a touch is sensed at the time of LHB driving in a touch display device according to the present exemplary embodiments.
Figure 11:
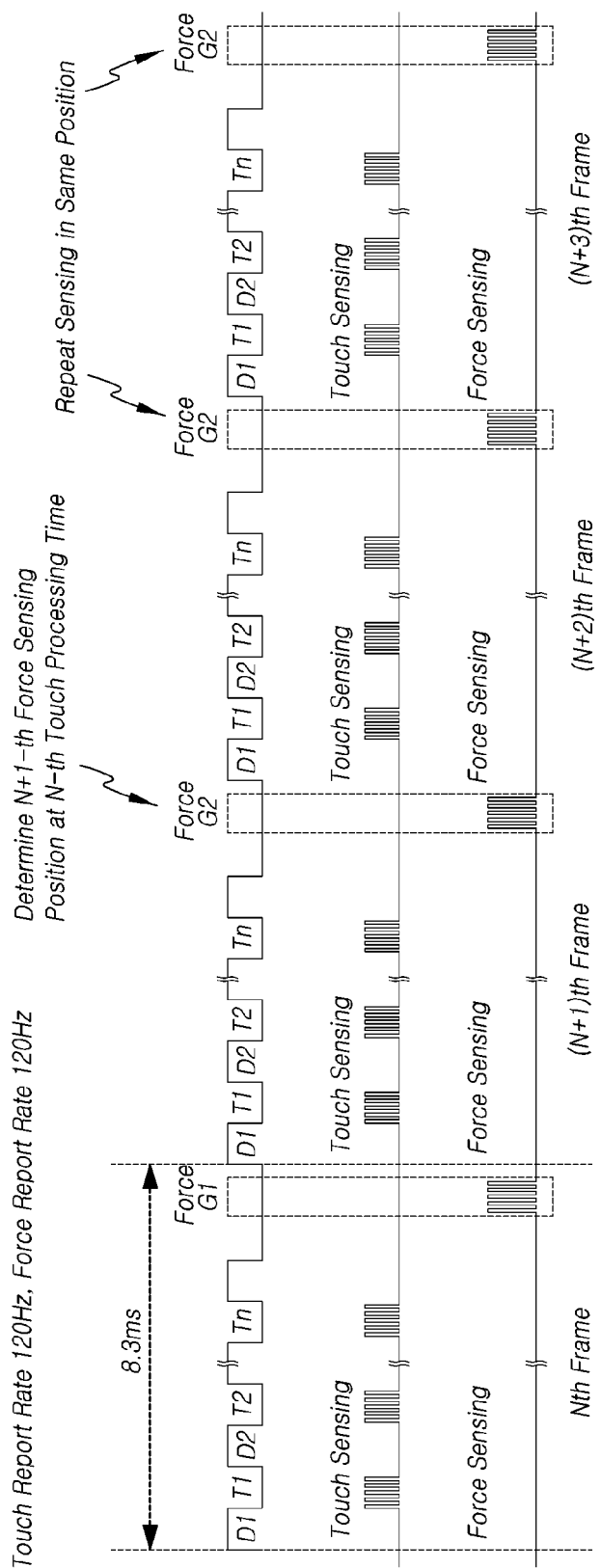
Figure 12:
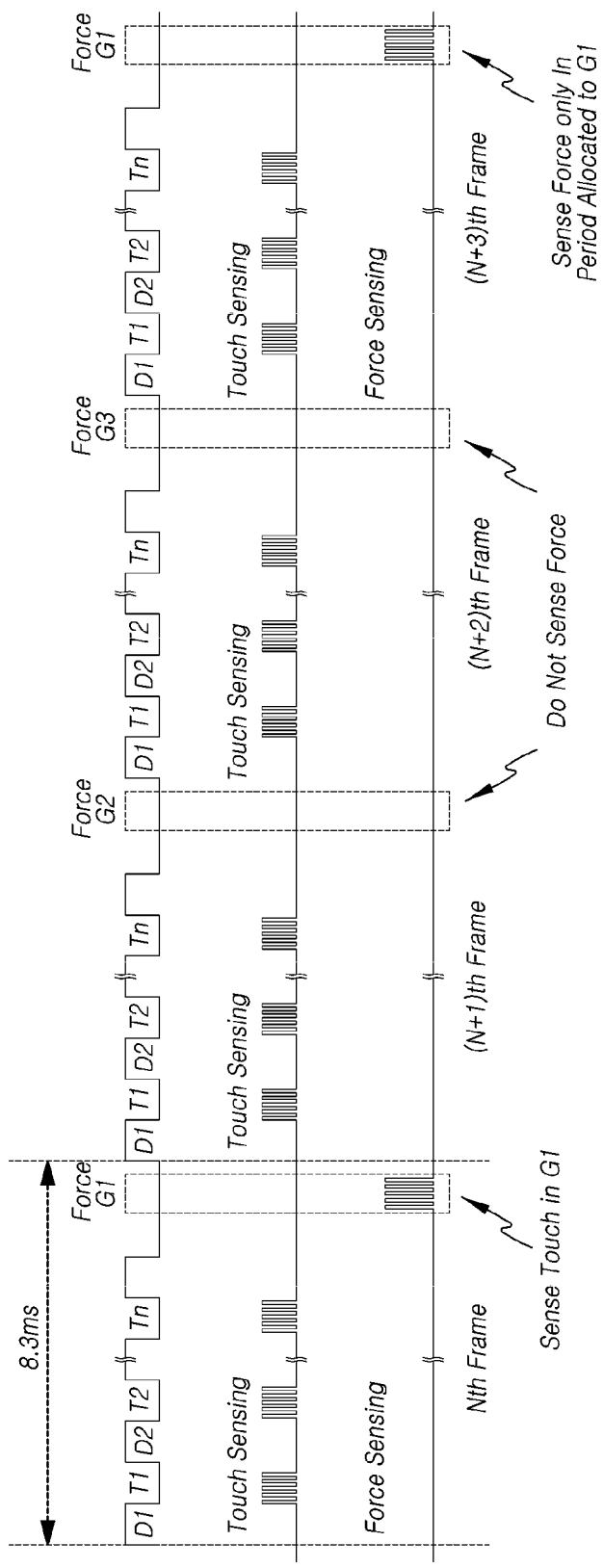

FIGS. 10 to 12 illustrate a timing of sensing a touch force at the time of LHB driving of a touch display device 100 according to the present exemplary embodiments.

FIG. 10 illustrates that the touch display device 100 senses the touch position (touch coordinate) and the touch force before sensing the touch of the user.

Referring to FIG. 10, the touch display device 100 alternately performs the display driving and the touch driving for every row of the first electrodes during one frame period. Further, the touch display device allocates a last touch driving period among the touch driving periods as a period for sensing a touch force.

The touch display device 100 senses the touch force for the first group during the force sensing period of the N-th frame, senses the touch force for the second group during the force sensing period of the N+1-th frame, and senses the touch force for the third group during the force sensing period of the N+2-th frame.

The touch display device 100 senses the touch force for the first group during the force sensing period of the N+3-th frame to receive the sensing signal from two or more first electrodes E1 disposed in each group for each frame and sense the touch force.

When the touch of the user is sensed during the touch sensing period of the touch driving period, the touch display device 100 senses the touch force by being limited to an area determined based on the sensed touch position.

Referring to FIG. 11, when the touch of the user is sensed during the touch sensing period of the N-th frame, the touch display device 100 determines an area where the touch force is to be sensed during the force sensing period of the N+1-th frame based on the sensed touch position.

When the touch is sensed by the sensing signal received from the first electrode E1 disposed in the second group during the touch sensing period of the N-th frame, the touch display device senses the touch force for the second group during the force sensing period of the N+1-th frame.

Further, the touch display device senses the touch force for the second group during the force sensing period of the N+2-th frame and the force sensing period of the N+3-th frame.

The touch display device senses the touch force for the second group for each frame before sensing the touch in another position, so that the touch force sensing report rate may be improved.

Alternatively, the touch display device senses the touch force only during the force sensing period of a frame allocated to an area including a position where the touch is sensed so that the power consumption may be reduced.

Referring to FIG. 12, when the touch is sensed during the touch sensing period of the N-th frame, the touch display device 100 determines an area where the touch force is to be sensed based on the sensed touch position.

For example, when the touch is sensed based on the sensing signal received from the first electrode E1 disposed in the first group, the touch display device 100 senses the touch force only during the force sensing period of the frame allocated to sense the touch force for the first group.

Therefore, the touch display device 100 does not sense the touch force during a force sensing period of the N+1-th frame allocated to sense the touch force for the second group or a force sensing period of the N+2-th frame allocated to sense the touch force for the third group.

Further, the touch display device senses the touch force for the first group during a force sensing period of the N+3-th frame allocated to sense the touch force for the first group.

The touch display device senses the touch force only during the force sensing period of a frame allocated for the touch force sensing for an area determined based on the position where the touch is sensed so that the power consumption may be reduced and the precision for sensing a touch force may be maintained.

Figure 13:
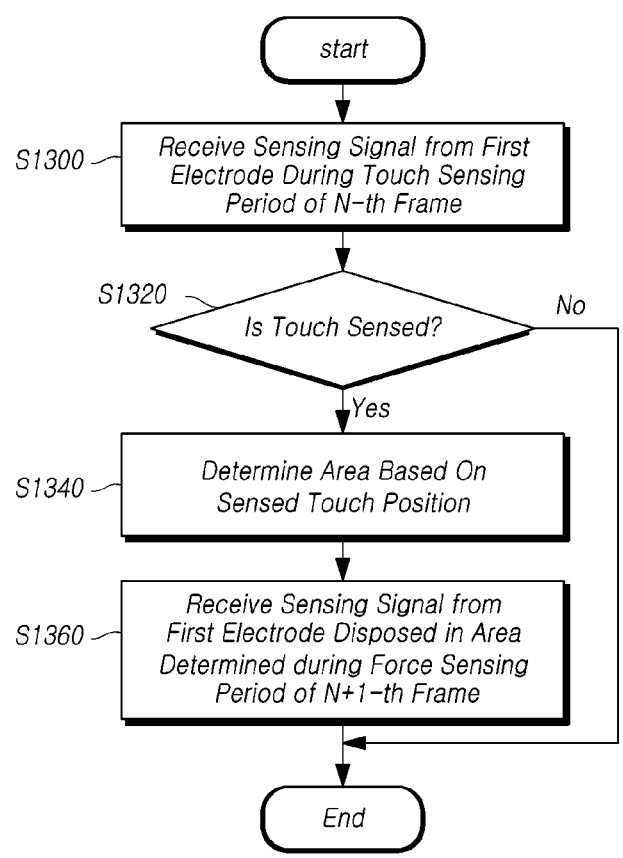
FIG. 13 is a view illustrating a process of a driving method of a touch display device according to the present exemplary embodiments.

FIG. 13 illustrates a process of a driving method of a touch display device 100 according to the present exemplary embodiments.

Referring to FIG. 13, the touch display device 100 according to the present exemplary embodiments receives a sensing signal from a first electrodes E1 during a touch sensing period of an N-th frame (S1300) to sense whether a touch is generated and a touch position (touch coordinate) based on the received sensing signal.

When the touch of the user is generated to sense the touch position (touch coordinate) (S1320), the touch display device determines an area where the touch force is to be sensed based on the sensed touch position (S1340).

The touch force sensing area may be determined by an area including a position of the touch among fixed areas or an area which includes the position of the touch and is variably set according to the position of the touch.

When the touch is sensed during a touch sensing period of an N-th frame to determine a touch force sensing area, the touch display device senses the touch force for a touch force sensing area determined during the force sensing period of the N+1-th frame (S1360).

Further, the touch display device may sense the touch force for the corresponding area for every force sensing period of each frame or sense the touch force only during the force sensing period of a frame allocated to the corresponding area.

According to the present exemplary embodiments, when the touch is sensed, the touch display device senses the touch force by being limited to the area determined based on the sensed touch position.

In this case, the touch display device senses the touch force only for a limited area for every force sensing period so that a touch force sensing report rate may be improved to improve the precision for sensing a touch force.

Alternatively, the touch display device senses the touch force only during the force sensing period of a frame allocated for a limited area so that the power consumption according to the touch force sensing may be reduced and the precision for sensing a touch force may be maintained.

It will be apparent to those skilled in the art that various modifications and variations can be made in the touch display device, the touch driving circuit, and the method for driving thereof of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
a plurality of first electrodes embedded in a display panel;
a second electrode located below the display panel and spaced apart from the first electrodes; and
a touch driving circuit configured to:
output a driving signal to at least one of the first electrodes and the second electrode during a touch driving period; and
receive a sensing signal from the first electrodes,
wherein, when a touch is sensed based on the sensing signal received in a touch sensing period of the touch driving period of an N-th frame, the touch driving circuit is further configured to receive the sensing signal from at least two of the first electrodes disposed in an area determined based on the sensed touch position, among the plurality of first electrodes embedded in the display panel, during a force sensing period of the touch driving period of an N+1-th frame,
wherein the touch sensing period is a period when the touch position of a user is sensed,
wherein the force sensing period is a period when the touch force of the user is sensed,
wherein N is a positive integer greater than or equal to 1, and
wherein, during the force sensing period of the N+1-th frame, the touch driving circuit is further configured to not output the driving signal to remaining first electrodes among the first electrodes, other than the at least two of the first electrodes, which are disposed in the remainder of the display panel, other than the area determined based on the sensed touch position.

2. The touch display device according to claim 1, wherein the touch driving circuit is further configured to receive the sensing signal from two or more of the first electrodes disposed in an area determined based on the sensed touch position during the force sensing period of each frame while sensing the touch in the sensed touch position.

3. The touch display device according to claim 1, wherein the touch driving circuit is further configured to receive the sensing signal from two or more of the first electrodes disposed in different areas during the force sensing period of each frame, and receive the sensing signal only during the force sensing period of a frame in which the sensing signal is received from two or more of the first electrodes disposed in an area including the sensed touch position while sensing the touch in the sensed touch position.

4. The touch display device according to claim 1, wherein the touch driving circuit is further configured to:
divide the plurality of first electrodes into M groups to receive the sensing signal; and
receive the sensing signal from two or more of the first electrodes disposed in a group including the sensed touch position,
wherein M is a positive integer greater than 1.

5. The touch display device according to claim 1, wherein the touch driving circuit is further configured to receive the sensing signal from two or more of the first electrodes disposed within a predetermined distance from the sensed touch position.

6. A touch driving circuit, comprising:
a driving signal output driver configured to output a driving signal to at least one electrode of a plurality of first electrodes and a second electrode during a touch driving period;
a sensing signal receiver configured to receive a sensing signal from the first electrodes during the touch driving period; and
a controller configured to control the driving signal driver and the sensing signal receiver,
wherein, when a touch is sensed based on the sensing signal received in a touch sensing period of the touch driving period of an N-th frame, the sensing signal receiver is further configured to receive the sensing signal from at least two of the first electrodes disposed in an area determined based on the sensed touch position, among the plurality of first electrodes embedded in the display panel, in the force sensing period of the touch driving period of an N+1-th frame, and
wherein the touch sensing period is a period when the touch position of a user is sensed,
wherein the force sensing period is a period when the touch force of the user is sensed,
wherein N is a positive integer greater than or equal to 1, and
wherein, during the force sensing period of the N+1-th frame, the touch driving circuit does not output the driving signal to remaining first electrodes among the first electrodes, other than the at least two of the first electrodes, which are disposed in the remainder of the display panel, other than the area determined based on the sensed touch position.

7. The touch driving circuit according to claim 6, wherein the sensing signal receiver is further configured to receive the sensing signal from two or more of the first electrodes disposed in an area determined based on a sensed touch position in the force sensing period of each frame while sensing the touch in the sensed touch position.

8. The touch driving circuit according to claim 6, wherein the sensing signal receiver is further configured to receive the sensing signal from two or more of the first electrodes disposed in different areas during the force sensing period of each frame and receives the sensing signal only during the force sensing period of a frame in which the sensing signal is received from two or more of the first electrodes disposed in an area including the sensed touch position while sensing the touch in the sensed touch position.

9. The touch driving circuit according to claim 6, wherein the sensing signal receiver is further configured to divide the plurality of first electrodes into M groups to receive the sensing signal and receive the sensing signal from two or more of the first electrodes disposed in a group including the sensed touch position, wherein, M is a positive integer greater than 1.

10. The touch driving circuit according to claim 6, wherein the sensing signal receiver is further configured to receive the sensing signal from two or more of the first electrodes disposed within a predetermined distance from the sensed touch position.

11. A driving method of a touch driving circuit, the method comprising:
receiving a sensing signal from a plurality of first electrodes embedded in a display panel during a touch sensing period of an N-th frame;
sensing a touch based on the received sensing signal; and
receiving the sensing signal from at least two of the first electrodes disposed in an area determined based on a sensed touch position, among the plurality of first electrodes embedded in the display panel, during a force sensing period of an N+1-th frame when the touch is sensed during the touch sensing period of the N-th frame,
wherein the touch sensing period is a period when the touch position of a user is sensed,
wherein the force sensing period is a period when the touch force of the user is sensed,
wherein N is a positive integer greater than or equal to 1, and
wherein, during the force sensing period of the N+1-th frame, the touch driving circuit is further configured to not output the driving signal to remaining first electrodes among the first electrodes, other than the at least two of the first electrodes, which are disposed in the remainder of the display panel, other than the area determined based on the sensed touch position.

12. The driving method according to claim 11, wherein, in the receiving of a sensing signal from two or more of the first electrodes, the sensing signal is received from two or more of the first electrodes disposed in an area determined based on the sensed touch position during the force sensing period of each frame while sensing the touch in the sensed touch position.

13. The driving method according to claim 11, wherein, in the receiving of a sensing signal from two or more of the first electrodes, the sensing signal is received from two or more of the first electrodes disposed in different areas during the force sensing period of each frame, and the sensing signal is received only during the force sensing period of a frame in which the sensing signal is received from two or more of the first electrodes disposed in an area including the sensed touch position, while sensing the touch in the sensed touch position.

14. The driving method according to claim 11, wherein:
in the receiving of a sensing signal from two or more of the first electrodes:
the plurality of first electrodes is divided into M groups to receive the sensing signal; and
the sensing signal is received from two or more of the first electrodes disposed in a group including the sensed touch position; and
M is a positive integer greater than 1.

15. The driving method according to claim 11, wherein, in the receiving of a sensing signal from two or more of the first electrodes, the sensing signal is received from two or more of the first electrodes disposed within a predetermined distance from the sensed touch position.

* * * * *